(12) United States Patent
Kim et al.

(10) Patent No.: US 9,231,869 B2
(45) Date of Patent: *Jan. 5, 2016

(54) ENSURING PREDICTABLE AND QUANTIFIABLE NETWORKING PERFORMANCE

(71) Applicant: MICROSOFT CORPORATION, Redmond, WA (US)

(72) Inventors: Changhoon Kim, Bellevue, WA (US); Albert G. Greenberg, Seattle, WA (US); Alireza Dabagh, Kirkland, WA (US); Yousef A. Khalidi, Bellevue, WA (US); Deepak Bansal, Redmond, WA (US); Srikanth Kandula, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/452,256

(22) Filed: Aug. 5, 2014

(65) Prior Publication Data

US 2014/0347998 A1 Nov. 27, 2014

Related U.S. Application Data

(63) Continuation of application No. 13/530,043, filed on Jun. 21, 2012, now Pat. No. 8,804,523.

(51) Int. Cl.
*H04L 12/26* (2006.01)
*H04L 12/801* (2013.01)
*H04L 12/825* (2013.01)
(Continued)

(52) U.S. Cl.
CPC ............... *H04L 47/11* (2013.01); *H04L 47/12* (2013.01); *H04L 47/263* (2013.01); *H04L 47/762* (2013.01); *H04L 47/822* (2013.01); *Y02B 60/31* (2013.01)

(58) Field of Classification Search
None
See application file for complete search history.

(56) References Cited

U.S. PATENT DOCUMENTS 6,826,620 B1 * 11/2004 Mawhinney ............ H04L 47/10
370/235
8,804,523 B2 * 8/2014 Kim et al. ...................... 370/235

(Continued)

OTHER PUBLICATIONS

Buyaa, et al., "Market-Oriented Cloud Computing: Vision, Hype, and Reality for Delivering IT Services as Computing Utilities" In Proceedings of 10th IEEE International Conference on High Performance Computing Communications, Sep. 25-27, 2008, pp. 5-13.

(Continued)

*Primary Examiner* — Anh-Vu Ly
(74) *Attorney, Agent, or Firm* — Nicholas Chen; Doug Barker; Micky Minhas

(57) ABSTRACT

The ensuring of predictable and quantifiable networking performance. Embodiments of the invention combine a congestion free network core with a hypervisor based (i.e., edge-based) throttling design to help insure quantitative and invariable subscription bandwidth rates. A lightweight shim layer in a hypervisor can adaptively throttle the rate of VM-to-VM traffic flow. A receiving hypervisor can detect congestion and communicate back to sending hypervisors that rates are to be regulated. In response, sending hypervisors can reduce transmission rate to mitigate congestion at the receiving hypervisor. In some embodiments, the principles are extended to any message processors communicating over a congestion free network.

20 Claims, 2 Drawing Sheets

(51) Int. Cl.
H04L 12/923 (2013.01)
H04L 12/911 (2013.01)

(56) References Cited

U.S. PATENT DOCUMENTS

| | | |
|---|---|---|
| 2007/0061433 A1 | 3/2007 | Reynolds et al. |
| 2007/0280255 A1 | 12/2007 | Tsang et al. |
| 2008/0259798 A1 | 10/2008 | Loh et al. |
| 2010/0128605 A1 | 5/2010 | Chavan et al. |
| 2010/0142524 A1* | 6/2010 | Garofalo ............ H04L 12/5693 370/389 |
| 2011/0054878 A1 | 3/2011 | Zhang et al. |
| 2011/0138050 A1 | 6/2011 | Dawson et al. |
| 2011/0179154 A1 | 7/2011 | Ravichandran et al. |
| 2011/0216648 A1 | 9/2011 | Mehrotra et al. |
| 2011/0225299 A1 | 9/2011 | Nathuji et al. |
| 2011/0231564 A1 | 9/2011 | Korsunsky et al. |
| 2011/0238855 A1 | 9/2011 | Korsunsky et al. |
| 2011/0276951 A1 | 11/2011 | Jain |
| 2011/0292792 A1* | 12/2011 | Zuo ........................ H04L 47/20 370/230 |
| 2011/0320625 A1 | 12/2011 | Riggert et al. |
| 2012/0079101 A1* | 3/2012 | Muppala ............ H04L 47/2441 709/224 |
| 2013/0003538 A1 | 1/2013 | Greenberg et al. |
| 2013/0003735 A1 | 1/2013 | Chao et al. |
| 2013/0014101 A1 | 1/2013 | Ballani et al. |
| 2013/0100803 A1* | 4/2013 | Menchaca ........... H04L 47/2475 370/230 |
| 2013/0254375 A1* | 9/2013 | Agiwal ............... H04L 43/0882 709/224 |
| 2013/0343191 A1 | 12/2013 | Kim et al. |
| 2015/0055486 A1* | 2/2015 | Maggiari ............ H04L 41/5035 370/242 |

OTHER PUBLICATIONS

Shinder, Thomas W., "Private Cloud Principles, Patterns, and Concepts", Published on: Oct. 13, 2011, Available at <<http://social.technet.microsoft.com/wiki/contents/articles/4346.aspx>>.
Tsai, et al., "Service-Oriented Cloud Computing Architecture", in Proceedings of Seventh Americas International Conference on Information Technology, Apr. 12-14, 2010. pp. 684-689.
Koehler, et al., "Cloud Services from a Consumer Perspective", In Proceedings of Sixteenth Americas Conference on Information Systems, Aug. 12-15, 2010.
"Cloud Sentinel: Network Performance Isolation for the Multi-Tenant Cloud", Available at least as early as Jan. 23, 2012.
U.S. Appl. No. 13/530,043, filed Dec. 31, 2013, Office Action.
U.S. Appl. No. 13/530,043, Apr. 14, 2014, Notice of Allowance.

* cited by examiner

ENSURING PREDICTABLE AND QUANTIFIABLE NETWORKING PERFORMANCE

CROSS-REFERENCE TO RELATED APPLICATIONS

This application is a continuation of U.S. patent application Ser. No. 13/530,043 filed on Jun. 21, 2012, entitled "ENSURING PREDICTABLE AND QUANTIFIABLE NETWORKING PERFORMANCE," which issued as U.S. Pat. No. 8,804,523 on Aug. 12, 2014, and which application is expressly incorporated herein by reference in its entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In some environments, computer systems operate in a cloud computing environment. In cloud computing environments, a cloud-service provider uses a common underlying physical network to host multiple customers' applications, sometimes referred to as "tenants". A tenant can have a set of virtual machines ("VMs") or application processes that is independently deployable and is solely owned by a single customer (i.e., subscription). Reachability isolation can be used to mitigate direct interference between tenants. However, reachability isolation is not sufficient, since a malicious or careless tenant can still interfere with other tenants in the network data plane by exchanging heavy traffic only among its own members (VMs).

Accordingly, other techniques can be used to attempt to isolate performance of tenants. Some techniques have relied on Transmission Control Protocol's ("TCP's") congestion control. However, a tenant can essentially achieve unbounded utilization of a network by using many TCP flows (connections) and using variations of TCP. Tenants can also use other protocols, such as, for example, User Datagram Protocol ("UDP") that do not respond to congestion control.

Trust of tenant networking stacks is also a problem.

Further, conventional in-network Quality of Service ("QoS") mechanisms (e.g., separate queues with Weighted Fair Queuing ("WFQ")) do not scale. These QoS mechanisms are also complicated and expensive to use for differentiating performance when tenants frequently join and leave. Statically throttling each VM on the sender side is inefficient and ineffective as it wastes any unused capacity and given a sufficient number of VMs, a tenant can always cause performance interference at virtually any static rate applied to each VM.

Accordingly, in cloud computing environments, due at least in part to one or more of these factors, it can be difficult to regulate network traffic in a way that reliably prevents disproportionate bandwidth consumption.

BRIEF SUMMARY

The present invention extends to the ensuring of predictable and quantifiable networking performance. Embodiments address networking congestion at a receiving computer system. A computing system manages one or more message processors. For instance, in a virtual machine environment, a hypervisor manages one or more message processors. A subscription bandwidth for a message processor is accessed. The subscription bandwidth indicates a quantitative and invariant minimum bandwidth for the message processor.

One or more data flows are received from a congestion free network core. The one or more data flows are sent from the sending message processor and directed to the receiving message processor. The combined bandwidth of the one or more data flows is calculated. The onset of congestion at the receiving computing system is detected. In response to detecting the onset of congestion, at least one message processor associated with the one or more data flows is identified as a violator of the subscription bandwidth. The at least one violating message processor is a sending message processor or a receiving message processor of one of the one or more data flows. The extent of the violation by the at least one violating message processor is determined.

Feedback for delivery to sender side adaptive rate limiters corresponding to the at least one violating message processor is determined. The feedback instructs the sender side adaptive rate limiters to reduce the bandwidth of the one or more data flows originating from the at least one violating message processor. The feedback is sent onto the congestion free network core for delivery to the sender side adaptive rate limiters.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
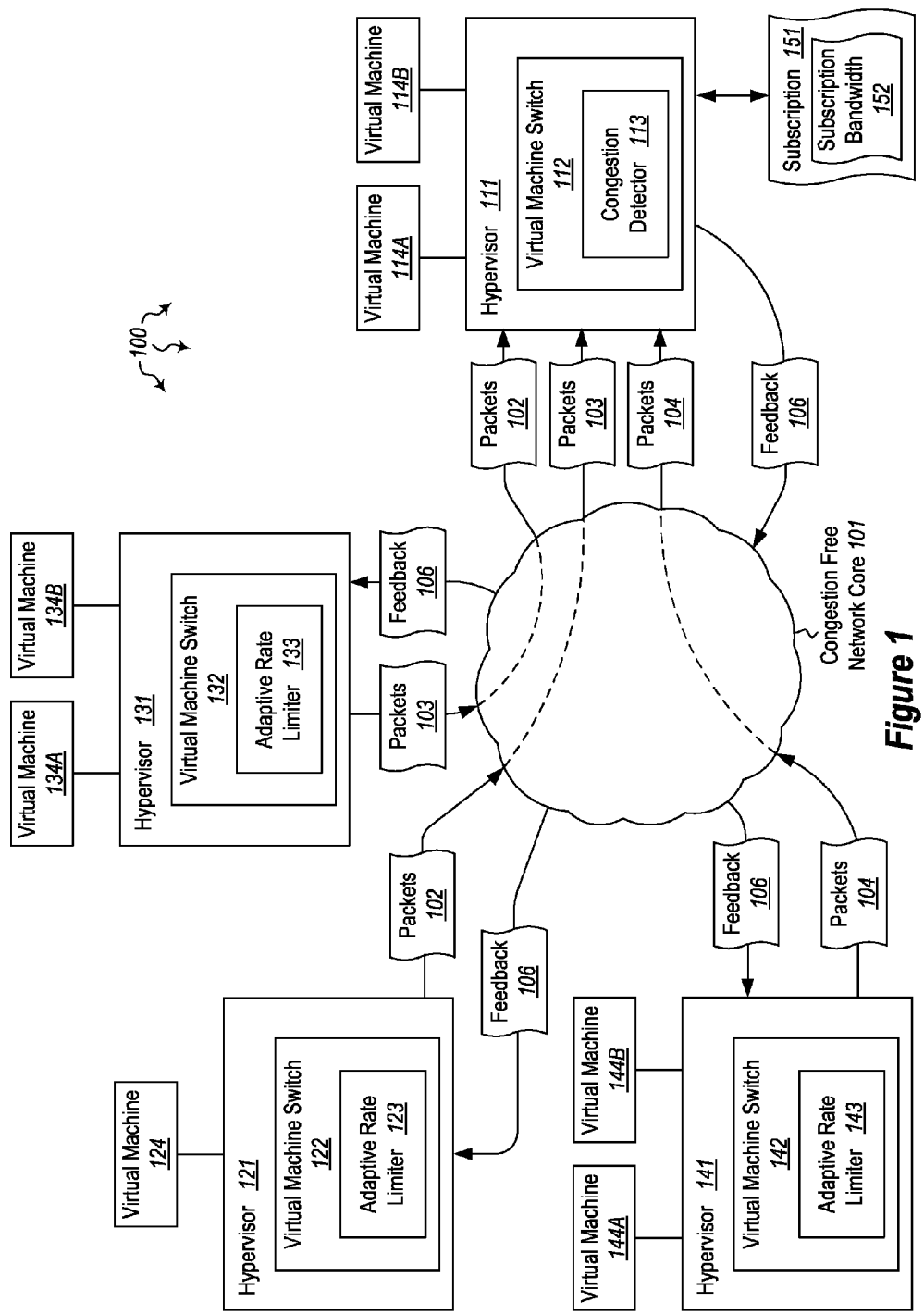
FIG. 1 illustrates an example computer architecture that facilitates ensuring predictable and quantifiable networking performance.

The present invention extends to methods, systems, and computer program products for ensuring predictable and quantifiable networking performance. Embodiments address networking congestion at a computer system. A computing system manages one or more message processors. For instance, in a virtual machine environment, a hypervisor manages one or more message processors. A subscription bandwidth for a message processor is accessed. The subscription bandwidth indicates a quantitative and invariant minimum bandwidth for the message processor.

One or more data flows are received from a congestion free network core. The one or more data flows are sent from sending message processors and directed to the message processor. The combined bandwidth of the one or more data flows is calculated. The onset of congestion at the receiving computing system is detected. In response to detecting the onset of congestion, at least one message processor associated with the one or more data flows is identified as a violator of the subscription bandwidth. The at least one violating message processor is a sending message processor or a receiving message processor of one of the one or more data flows. The extent of the violation by the at least one violating message processors is determined.

Feedback for delivery to sender side adaptive rate limiters corresponding to the at least one violating message processor is determined. The feedback instructs the sender side adaptive rate limiters to reduce the bandwidth of the one or more data flows originating from the at least one violating message processor. The feedback is sent onto the congestion free network core for delivery to the sender side adaptive rate limiters.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium that can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and the following claims, "cloud computing" is defined as a model for enabling ubiquitous, convenient, on-demand network access to a shared pool of configurable computing resources (e.g., networks, servers, storage, applications, and services) that can be provisioned and released with reduced management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In this description and the following claims, "hypervisor" (or virtual machine manager ("VMM")) is defined as a component that permits multiple operating system instances (or Virtual Machines ("VMs")) to share a hardware host. A hypervisor can run directly on a host's hardware (type 1) or on top of an operating system running on a host's hardware (type 2). A hypervisor presents a virtual operating platform and manages the execution of operating system instances. For example, through virtualization a hypervisor can present individual Virtual Network Interface Cards ("VNICs") to a number of different operating system instances based on the hardware of an underlying Network Interface Card ("NIC"). A hypervisor controls the allocation of host processes and resources to each operating system instance to avoid disruptions between the operating system instances. Hypervisors can be used on machines in a cloud computing environment.

Embodiments of the invention combine a congestion free network core with a hypervisor based (i.e., edge-based) throttling design. A lightweight shim layer in a hypervisor can adaptively throttle the rate of VM-to-VM traffic flow. Regulation of traffic flow takes into account the speed of VM ports and congestion state visible to receiving-end hosts. A hypervisor based approach has increased simplicity and increased scalability in network Quality of Service ("QoS") mechanisms. Throttling VM-to-VM traffic promotes fairness enforcement (i.e., regulating connections for different protocols, such as, User Datagram Protocol ("UDP") and Transmission Control Protocol ("TCP")). Throttling VM-to-VM traffic also provides a new measure of fairness aligned with per-VM hourly charging models used in cloud based environments.

FIG. 1 illustrates an example computer architecture 100 that facilitates ensuring predictable and quantifiable networking performance. Referring to FIG. 1, computer architecture 100 includes computing systems 111, 121, 131, and 141 in a general embodiment. In the more specific virtual machine embodiment of FIG. 1, the computing systems are hypervisors 111, 121, 131, and 141. In the general embodiment, each computing system 111, 121, 131 and 141 manages message processors. For instance, in the specific virtual machine embodiment, each hypervisor manages one or more virtual machines, the virtual machines representing an example of a message processor. For example, hypervisor 111 manages virtual machines 114A and 114B, hypervisor 121 manages virtual machine 124, hypervisor 131 manages virtual machines 134A and 134B, and hypervisor 141 manages virtual machines 144A and 144B. Hypervisors 111, 121, 131, and 141 are connected to congestion free network core 101. Each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over congestion free network core 101. Hereafter, the specific virtual machine embodiment will be described, although it will be understood that the principles described herein extend to the general embodiment in which computing systems generally are connected over the congestion free core network 101

Congestion free network core 101 is configured such that there is an extremely low (or even essentially no) chance of congestion within congestion free network core 101. Congestion free network core 101 can be a full bisection-bandwidth network. Congestion free network core 101 can be established using any of variety of network topologies, including but not limited to Fat Tree and VL2.

Hypervisors 111, 121, 131, and 141 include virtual machine switches 112, 122, 132, and 142 respectively. In general, when a hypervisor receives packets, the corresponding virtual switch directs the packets to the appropriate virtual machine (e.g., by a tag or electronic address). A virtual machine switch can include an adaptive rate limiter and/or a congestion detector. For example, virtual machine switch 112 includes congestion detector 113 and virtual machine switches 122, 132, and 142 include adaptive rate limiters 123, 133, and 143 respectively. Additionally, virtual machine switch 112 can include an adaptive rate limiter (not shown) and each of virtual machine switches 122, 132, and 142 can include a congestion detector (not shown). In the more general embodiment that extends beyond virtual machine environments, the congestion detector 113, and the adaptive rate limiters 123, 133, and 143, may be considered as logic implemented by computing systems 111, 121, 131, and 141, respectively.

In general, a VM (or other message processor) can operate in accordance with a defined subscription (e.g., a Service Level Agreement ("SLA")). For example, a user of a VM can purchase the right to use congestion free network core 101 from a service provider (e.g., a data center provider). As part of the purchase, the user and service provider can agree to a set of parameters defining a level of network service for the VM. The set of parameters can include a subscription bandwidth that is to be available to the VM. The subscription bandwidth can be a quantitative and invariant minimum bandwidth allocated for the VM.

Through a corresponding hypervisor, a congestion detector is aware of the maximum bandwidth of underlying networking hardware, such as, NICs and Top-of-Tack ("TOR") switches, used by VMs. For example, hypervisor 111 can make congestion detector 113 aware of bandwidth limitations in the hardware supporting VMs 114A and 114B (e.g., a 1 GB/s NIC). During operation, a congestion detector monitor receives packets for various data flows directed to virtual machines.

From received packets, a congestion detector can detect when congestion is likely to occur or is occurring in the supporting hardware. Congestion is likely to occur or is occurring when the received bandwidth at a hypervisor approaches the bandwidth limitations of underlying hardware. For example, when 975 MB/s are being received at a NIC rated for 1 GB/s there is some likelihood that congestion is occurring. A congestion detector can be configured to indicate congestion when received bandwidth is within a specified threshold (e.g., an amount or percentage) of hardware bandwidth limitations. In this particular illustrated system 100, the congestion detector is placed at a point of potential congestion in the network, and that point of congestion is within a single server. This has the potential to provide quicker and more stable control.

Any of a variety of different mechanisms can be used to detect congestion. In some embodiments, a receiving hypervisor (e.g., hypervisor 111) uses software metering to detect congestion. In other embodiments, a protocol or protocol extension, such as, for example, Explicit Congestion Notification ("ECN"), is used to detect congestion. ECN can be used at a last hop device, such as, for example, a TOR switch.

When congestion occurs, the subscription bandwidth for one or more VMs may be violated. In response to detecting congestion, the congestion detector can identify sending VMs as violators. Based on the extent of the violations, the congestion detector can send feedback to adaptive rate limiters for the sending VMs.

Generally, an adaptive rate limiter can regulate the rate of sending data packets onto congestion free network core 101. An adaptive rate limiter can receive feedback from a congestion detector. In response to received feedback, an adaptive rate limiter can reduce the bandwidth used to send packets to avoid further congestion. In absence of received feedback, an adaptive rate limiter can increase the bandwidth used to send packets onto congestion free network core 101 to promote efficient use of resource.

An adaptive rate limiter can use any of a variety of different feedback algorithms to regulate bandwidth when sending packets. In some embodiments, adaptive rate limiters use an Additive Increase/Multiplicative Decrease ("AIMD") algorithm for congestion avoidance. AIMD combines linear growth of the congestion window with an exponential reduction when congestion takes place. Other algorithms, such as, for example, multiplicative-increase/multiplicative-decrease ("MIMD") and additive-increase/additive-decrease ("AIAD") can also be used.

Figure 2:
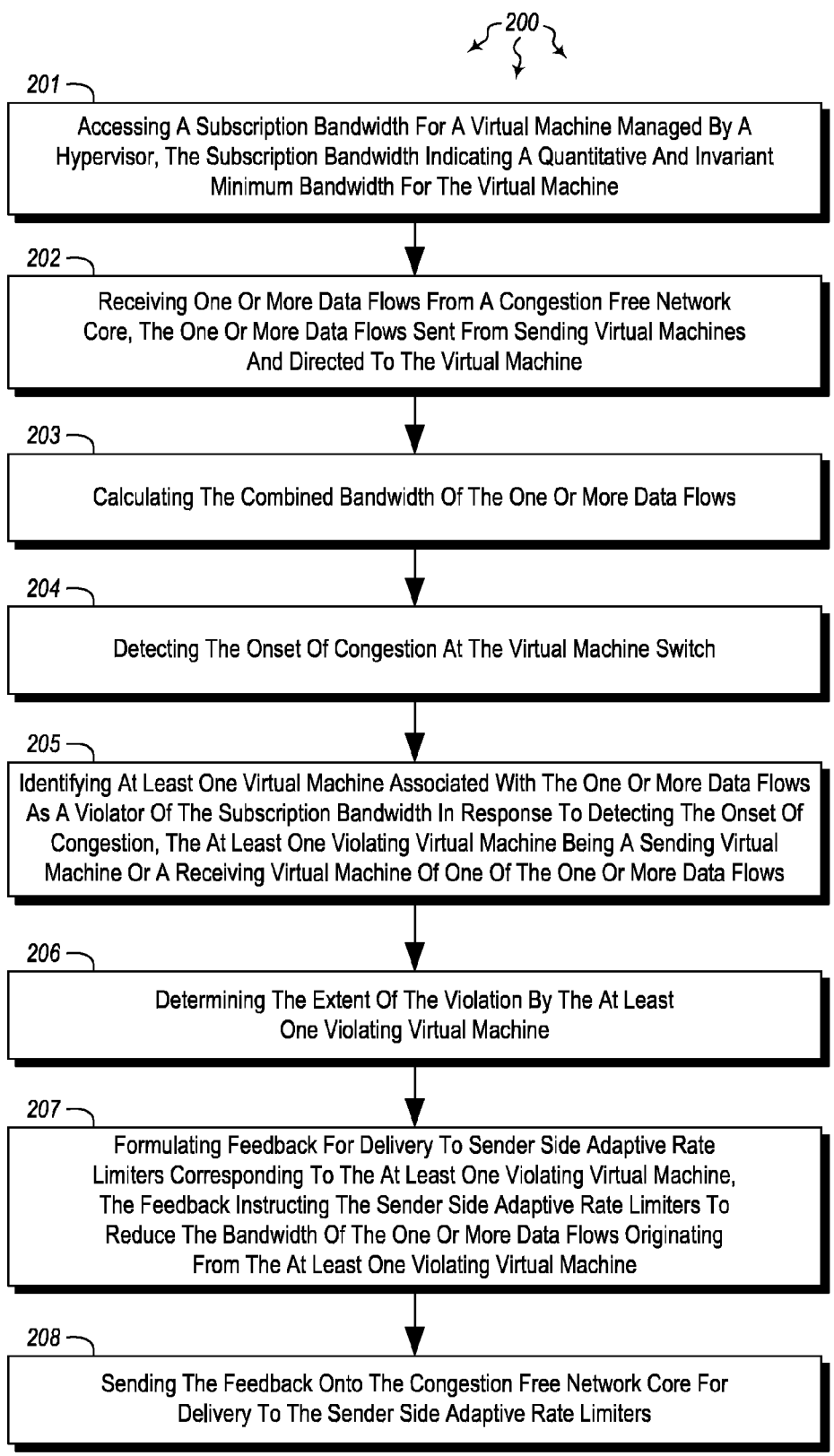
FIG. 2 illustrates a flow chart of an example method for ensuring predictable and quantifiable networking performance.

FIG. 2 illustrates a flow chart of an example method 200 for addressing network congestion at a computer system. Method 200 will be described with respect to the components and data of computer architecture 100.

Method 200 includes an act of accessing a subscription bandwidth for a virtual machine managed by a hypervisor, the subscription bandwidth indicating a quantitative and invariant minimum bandwidth for the virtual machine (act 201). For example, hypervisor 111 can access subscription bandwidth 152 from subscription 151. Subscription 151 can be a previously established subscription for virtual machine 114A. Subscription bandwidth 152 can indicate a quantitative and invariant minimum bandwidth (e.g., 400 MB/s) for the virtual machine 114A.

Method 200 includes an act of receiving one or more data flows from a congestion free network core, the one or more data flows sent from sending virtual machines and directed to the virtual machine (act 202). For example, virtual machines 124, 134A, and 144B can send packets 102, 103, and 104 respectively onto congestion free network core 101 as part of corresponding data flows. Packets 102, 103, and 104 can be directed to virtual machines managed by hypervisor 111 (e.g., virtual machines 114A and/or 114B). Hypervisor 111 can receive packets 102, 103, and 104 from congestion free network core 101.

Method 200 includes an act of calculating the combined bandwidth of the one or more data flows (act 203). For example, congestion detector 113 can calculate the combined bandwidth for the data flows corresponding to packets 102, 103, and 104. Method 200 includes an act of detecting the onset of congestion at the virtual machine switch (act 204). For example, congestion detector 113 can detect the onset of congestion at virtual machine switch 112. The onset of congestion can be detected by determining that the combined bandwidth of the data flows corresponding to packets 102, 103, and 104 is within a specified threshold of the bandwidth limitations for virtual machine switch 112. For example, the onset of congestion may be detected when the combined bandwidth of the data flows is 9.5 GB/s and virtual machine switch 112 is capable of 10 GB/s.

Method 200 includes an act of identifying at least one virtual machine associated with the one or more data flows as a violator of the subscription bandwidth in response to detecting the onset of congestion, the at least one violating virtual machine being a sending virtual machine or a receiving virtual machine of one of the one or more data flows (act 205). For example, congestion detector 113 can identify one or more of virtual machines 124, 134A, and 144B as violating subscription bandwidth 152 in response to detecting the onset of congestion at virtual machine switch 112. Congestion detector 113 may also identify virtual machine 114B as a violator of subscription bandwidth 152. For example, individual bandwidth for each of a plurality of data flows may not violate subscription bandwidth 152. However, when the plurality of data flows are for the same receiving virtual machine, the sum of the individual bandwidths may violate subscription bandwidth 152.

Method 200 includes an act of determining the extent of the violation by the at least one violating virtual machine (act 206). For example, congestion detector 113 can determine a bandwidth amount by which subscription bandwidth 152 is being violated by one or more of virtual machines 124, 134A, 144B, and 114B.

Method 200 includes an act of formulating feedback for delivery to sender side adaptive rate limiters corresponding to the at least one violating virtual machine, the feedback instructing the sender side adaptive rate limiters to reduce the bandwidth of the one or more data flows originating from the at least one violating virtual machine (act 207). For example, congestion detector 113 can formulate feedback 106 for delivery to one or more of adaptive rate limiters 123, 133, and 143 (or even an adaptive rate limiter at hypervisor 111, for example, when virtual machine 114B is a violator). Feedback 106 can instruct the one or more adaptive rate limiters 123, 133, and 143 to reduce the bandwidth of data flows (corresponding to one or more of packets 102, 103, and 104) from one or more of virtual machines 124, 134A, and 144B respectively. When appropriate, feedback 106 can also be formulated for delivery to an adaptive rate limiter at hypervisor 111.

In general, feedback can be based on the subscription bandwidth of a receiving virtual machine and possibly also the subscription bandwidth of one or more sending virtual machines. For example, virtual machine 124 may also have a specified subscription bandwidth. As such, feedback 106 can be formulated based on subscription bandwidth 152 and the specified subscription bandwidth for virtual machine 124. Feedback 106 can be formulated so that adaptive rate limiter 123 does not throttle back the data flow corresponding to packet 102 to a rate below the specified subscription bandwidth for virtual machine 124.

Method 200 includes an act of sending the feedback onto the congestion free network core for delivery to the sender side adaptive rate limiters (act 208). For example, congestion detector 113 can send feedback 106 on congestion free network core 101 for delivery to one or more of adaptive rate limiters 123, 133, and 143. Adaptive rate limiters that receive feedback 106 can reduce bandwidth of respective data flows in accordance with a bandwidth regulation algorithm such as, for example, AIMD, etc.

In some embodiments, the same or similar feedback may be send to all of the sending virtual machines, whether violating or not. The send-side hypervisor may then determine an appropriate manner to rate limit the sending virtual machines, perhaps choosing to more aggressively rate limit the violating virtual machines, as compared to the non-violating virtual machines. Also, such computation may occur at a tenant level in which there are multiple sending virtual machines associated with a single tenant. In that case, the feedback proportional rate adaption may be performed for all violating (and perhaps non-violating) virtual machines associated with that tenant. Such proportional rate limiting may be performed by some tenant-level logic.

Congestion detectors and adaptive rate limiters can be used regulate data flow bandwidth for various different types of traffic, including TCP traffic and non-TCP (e.g., UDP) traffic. As such, the bandwidth of TCP flows as well as non-TCP flows can be regulated in accordance with AIMD or other congestion avoidance algorithms. Data flow bandwidth from different types of traffic can also be considered together when detecting congestion. For example, a receiving hypervisor can receive at least one data flow of TCP traffic and at least one data flow of non-TCP (e.g., UDP) traffic. The receiving hypervisor can consider the bandwidth of the at least one TCP data flow and the bandwidth of the at least one non-TCP data flow when detecting congestion of the receiving hypervisor. Feedback from the receiving hypervisor can be used to regulate the at least one TCP data flow as well as the at least one non-TCP data flow.

Accordingly, embodiments of the invention combine a congestion free network core with a hypervisor based (i.e., edge-based) throttling design to help insure quantitative and invariable subscription bandwidth rates. Embodiments can confine the scope of congestion to a single physical machine and limit the number of contributors to congestion. Since congestion is visible to a receiving hypervisor, congestion is more easily detected and communicated back to sending hypervisors. Communication back to sending hypervisors provides a closed-loop control approach, therefore increasing stability and permitting self-clocking.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method implemented in a computing environment that includes a plurality of computing nodes that provide services for one or more users, with the plurality of computing nodes each including a message processor that communicates packets comprising data flows that are received by at least one computer system that includes one or more processors and system memory, the computer system also including a message processor for processing the data flows to provide the services for the one or more users, wherein the implemented method is a method for addressing network congestion arising from one or more of the computing nodes, the method comprising the following acts:

the computer system accessing a predetermined bandwidth limitation for a message processor, the predetermined bandwidth limitation indicating a quantitative and invariant minimum bandwidth for the message processor;

the computer system accessing one or more data flows;

the computer system calculating a combined bandwidth of the one or more received data flows;

the computer system detecting an onset of congestion at the computer system by determining that the calculated combined bandwidth is within a specified threshold;

the computer system, subsequent to detecting the onset of congestion, identifying at least one violating message processor of one of the computing nodes associated with the one or more data flows as a cause of the onset of congestion by determining that the at least one violating message processor is utilizing a bandwidth that exceeds a bandwidth limitation associated with the at least one violating message processor;

the computer system determining an extent in which the at least one violating message processor is over utilizing the bandwidth;

the computer system formulating at least one feedback message that serves to rate limit the at least one violating message processor; and the computer system sending the feedback message for delivery to at least one adaptive rate limiter that is enabled to limit bandwidth utilization of the violating message processor.

2. The method as recited in claim 1, wherein the at least one data flow comprises a first data flow having a protocol complying with Transmission Control Protocol (TCP) as well as least one other data flow having an other protocol different than Transmission Control Protocol (TCP).

3. The method as recited in claim 2, wherein the other protocol comprises User Datagram Protocol (UDP).

4. The method as recited in claim 1, wherein said computer system is a virtual machine associated with a hypervisor.

5. The method as recited in claim 1, wherein the at least one feedback message is an instruction to reduce the bandwidth utilized by the violating message processor.

6. The method as recited in claim 5, wherein the instruction is an instruction to reduce the bandwidth in accordance with an additive increase/multiplicative decrease (AIMD) algorithm.

7. The method as recited in claim 1, wherein detecting the onset of congestion comprises an act of a software meter detecting the onset of congestion at the computer system.

8. The method as recited in claim 1, wherein detecting the onset of congestion comprises an act of using Explicit Congestion Notification (ECN) to detect the onset of congestion.

9. The method as recited in claim 1, wherein said detecting the onset of congestion is performed by a virtual switch within a hypervisor.

10. The method as recited in claim 1, wherein the adaptive rate limiter is included within a virtual switch of a hypervisor.

11. One or more computer hardware storage devices having stored thereon computer executable instructions that, when executed by one or more processors, implement a computer-controlled method for addressing network congestion arising from one or more of computing nodes in a computing environment that includes a plurality of computing nodes that provide services for one or more users, with the plurality of computing nodes each including a message processor that communicates packets comprising data flows that are received by at least one computer system that includes one or more processors and system memory, the computer system also including a message processor for processing the data flows to provide the services for the one or more users, wherein the implemented method is a method for addressing network congestion arising from one or more of the computing nodes, wherein the method includes:

the computer system accessing a predetermined bandwidth limitation for a message processor, the predetermined bandwidth limitation indicating a quantitative and invariant minimum bandwidth for the message processor;

the computer system accessing one or more data flows;

the computer system calculating a combined bandwidth of the one or more received data flows;

the computer system detecting an onset of congestion at the computer system by determining that the calculated combined bandwidth is within a specified threshold;

the computer system, subsequent to detecting the onset of congestion, identifying at least one violating message processor of one of the computing nodes associated with the one or more data flows as a cause of the onset of congestion by determining that the at least one violating message processor is utilizing a bandwidth that exceeds a bandwidth limitation associated with the at least one violating message processor;

the computer system determining an extent in which the at least one violating message processor is over utilizing the bandwidth;

the computer system formulating at least one feedback message that serves to rate limit the at least one violating message processor; and the computer system sending the feedback message for delivery to at least one adaptive rate limiter that is enabled to limit bandwidth utilization of the violating message processor.

12. The method as recited in claim 11, wherein the at least one data flow comprises a first data flow having a protocol complying with Transmission Control Protocol (TCP) as well as least one other data flow having an other protocol different than Transmission Control Protocol (TCP).

13. The method as recited in claim 12, wherein the other protocol comprises User Datagram Protocol (UDP).

14. The method as recited in claim 11, wherein the adaptive rate limiter is included within a virtual switch of a hypervisor of a virtual machine.

15. The method as recited in claim 11, wherein the at least one feedback message is an instruction to reduce the bandwidth utilized by the violating message processor.

16. The method as recited in claim 15, wherein the instruction is an instruction to reduce the bandwidth in accordance with an additive increase/multiplicative decrease (AIMD) algorithm.

17. The method as recited in claim 11, wherein detecting the onset of congestion comprises an act of a software meter detecting the onset of congestion at the computer system.

18. The method as recited in claim 11, wherein detecting the onset of congestion comprises an act of using Explicit Congestion Notification (ECN) to detect the onset of congestion.

19. The method as recited in claim 11, wherein detecting the onset of congestion is performed by a virtual switch within a hypervisor of a virtual machine.

20. A computing system comprising:
at least one processor; and
system memory having stored computer-executable instructions which executed by the at least one processor, implement a method in a computing environment that includes a plurality of computing nodes that provide services for one or more users, with the plurality of computing nodes each including a message processor that communicates packets comprising data flows that are received by at least one computer system that includes one or more processors and system memory, the computer system also including a message processor for processing the data flows to provide the services for the one or more users, wherein the implemented method is a method for addressing network congestion arising from one or more of the computing nodes, the method comprising the following acts:

the computer system accessing a predetermined bandwidth limitation for a message processor, the predetermined bandwidth limitation indicating a quantitative and invariant minimum bandwidth for the message processor;

the computer system accessing one or more data flows;

the computer system calculating a combined bandwidth of the one or more received data flows;

the computer system detecting an onset of congestion at the computer system by determining that the calculated combined bandwidth is within a specified threshold;

the computer system, subsequent to detecting the onset of congestion, identifying at least one violating message processor of one of the computing nodes associated with the one or more data flows as a cause of the onset of congestion by determining that the at least one violating message processor is utilizing a bandwidth that exceeds a bandwidth limitation associated with the at least one violating message processor;

the computer system determining an extent in which the at least one violating message processor is over utilizing the bandwidth;

the computer system formulating at least one feedback message that serves to rate limit the at least one violating message processor; and the computer system sending the feedback message for delivery to at least one adaptive rate limiter that is enabled to limit bandwidth utilization of the violating message processor.

* * * * *